United States Patent
Bansal et al.

(10) Patent No.: US 9,749,800 B2
(45) Date of Patent: Aug. 29, 2017

(54) CONTROLLING WIRELESS SCANS USED TO DETERMINE THE LOCATION OF A PORTABLE ELECTRONIC DEVICE

(71) Applicant: Apple Inc., Cupertino, CA (US)

(72) Inventors: Monika Bansal, Sunnyvale, CA (US); Devrim Varoglu, Santa Clara, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 13/736,211

(22) Filed: Jan. 8, 2013

(65) Prior Publication Data

US 2014/0179344 A1    Jun. 26, 2014

Related U.S. Application Data

(60) Provisional application No. 61/745,323, filed on Dec. 21, 2012.

(51) Int. Cl.
*H04W 4/02* (2009.01)
*H04W 52/02* (2009.01)

(52) U.S. Cl.
CPC .......... *H04W 4/025* (2013.01); *H04W 4/028* (2013.01); *H04W 52/0209* (2013.01)

(58) Field of Classification Search
CPC .......... H04W 4/22; H04W 4/02; H04W 4/04; H04W 64/00; H04W 52/00; H04W 52/0209; H04W 52/0225; H04W 52/0229; H04W 52/0232; H04W 52/0241; H04W 52/0245; H04W 52/0248; H04W 52/0251; H04W 52/0258; H04W 52/0287; H04W 52/029; H04W 52/0293
USPC .................. 455/404.1, 404.2, 456.1–457
See application file for complete search history.

(56) References Cited

U.S. PATENT DOCUMENTS

| | | | |
|---|---|---|---|
| 6,597,906 B1 * | 7/2003 | Van Leeuwen et al. .. | 455/422.1 |
| 8,249,807 B1 * | 8/2012 | Barbeau et al. ............. | 701/490 |
| 2006/0211430 A1 * | 9/2006 | Persico ..................... | 455/456.1 |
| 2009/0030610 A1 * | 1/2009 | Clark ........................... | 701/213 |

* cited by examiner

*Primary Examiner* — Erica Navar
(74) *Attorney, Agent, or Firm* — Sterne, Kessler, Goldstein & Fox PLLC

(57) ABSTRACT

Described herein are methods and apparatus for controlling wireless scans used to determine the location of a portable electronic device. In described embodiments, the portable electronic device determines if user notifications are currently suppressed (i.e., if the device is operating in a "do not disturb" mode). In the case that user notifications are currently suppressed on the portable electronic device, the interval between the wireless scans used to determine the location of the portable electronic device is increased. Furthermore, in described embodiments, the portable electronic device determines its location. Then based on its location, it determines a travel time to a boundary (e.g., a geo-fence) and adjusts the frequency of wireless scans used to determine the location of the portable electronic device based on the travel time.

20 Claims, 3 Drawing Sheets

CONTROLLING WIRELESS SCANS USED TO DETERMINE THE LOCATION OF A PORTABLE ELECTRONIC DEVICE

RELATED APPLICATION

This application claims priority under 35 U.S.C. §119 to U.S. Provisional Application No. 61/745,323, entitled "Controlling Wireless Scans Used to Determine the Location of a Portable Electronic Device," by Monika Bansal, Devrim Varoglu and Swapnil R. Dave, filed 21 Dec. 2012, the contents of which are herein incorporated by reference in their entirety.

BACKGROUND

Field

The described embodiments relate to controlling the transmission and reception of wireless signals from a portable electronic device. More specifically, the described embodiments relate to controlling wireless scans used to determine a location of a portable electronic device.

Related Art

Many portable electronic devices use wireless signals to help determine their location. These wireless scans may be implemented using 802.11 technology (such as WiFi scans), cellular technology (such as scans using 3G or 4G network signals), and Global Positioning System (GPS) signals to help determine the location of the portable electronic device. This location information can be used for a variety of purposes, including the provision of location-based notifications to remind a user to perform tasks or take other actions based on their location. For example, a user may set a notification to be generated when the user arrives at home to remind the user to perform a household task, such as taking out the trash. However, portable electronic devices often must operate from battery power, and wireless scans can consume a significant amount of energy. This may result in a decrease in the length of time that such devices can be used before recharging the battery which may have a negative impact on the user's experience.

BRIEF DESCRIPTION OF THE FIGURES

In the figures, like reference numerals refer to the same figure elements.

DETAILED DESCRIPTION

Figure 1:
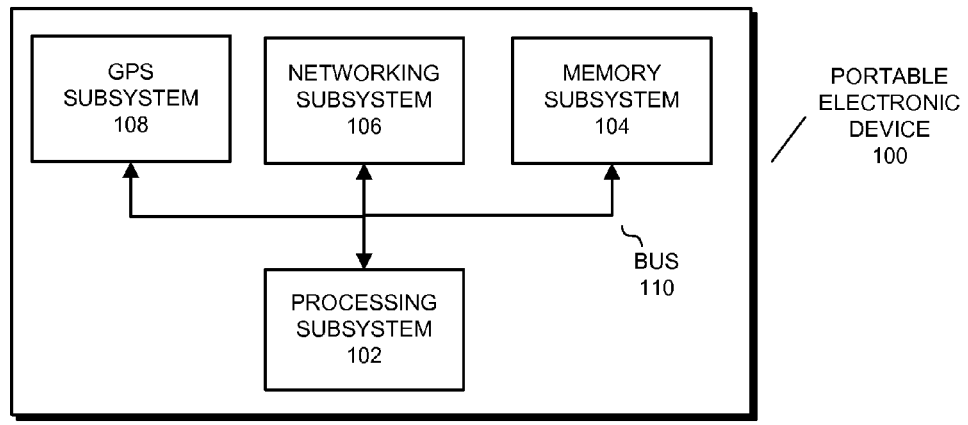
FIG. 1 presents a block diagram illustrating a portable electronic device in accordance with described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a portable electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that, in the described embodiments, the computer-readable storage medium does not include non-statutory computer-readable storage mediums such as transmission signals.

The methods and processes described in this detailed description can be included in hardware modules. For example, the hardware modules can include, but are not limited to one or more application-specific integrated circuit (ASIC) chips, field-programmable gate arrays (FPGAs), other programmable-logic devices, dedicated logic devices, and microcontrollers. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When a device (e.g., a portable electronic device) with computing capabilities reads and executes the code and/or data stored on the computer-readable storage medium, the device performs the methods and processes embodied as data structures and code and stored within the computer-readable storage medium. For example, in some embodiments, a processing subsystem can read the code and/or data from a memory subsystem that comprises a computer-readable storage medium and can execute code and/or use the data to perform the methods and processes.

In the following description, we refer to "some embodiments." Note that "some embodiments" may describe a subset of all of the possible embodiments, but does not always specify the same subset of embodiments.

Overview

Described embodiments perform operations for controlling wireless scans used to determine the location of a portable electronic device. In described embodiments, the portable electronic device can include any portable electronic device that includes a network subsystem and/or a Global Positioning System (GPS) subsystem that can use wireless scans to determine the location of the portable electronic device ("location scans"). A portable electronic device can be or include, but is not limited to, a smartphone, a tablet computer, a laptop computer, or a netbook.

A portable electronic device, such as a smartphone, may use one or more wireless scans, such as WiFi scans, cellular network scans, and/or GPS scans, to determine its location.

For example, in some embodiments, a portable electronic device may receive signals from nearby WiFi access points (APs). Then, based on unique network identifiers (e.g., media access control (MAC) addresses) of the APs and signal strength measurements of the signal from each AP, the portable electronic device can determine its location using a crowd-sourced database of identifiers and signal strengths. Additionally, the portable electronic device may also use cellular network signals received from cell towers, and based on unique tower identifiers and signal strength measurements of the received cellular network signals, the portable electronic device can use a crowd-sourced data base to determine its location.

Note that in some embodiments, the portable electronic device may determine its location by using the unique identifiers (e.g., WiFi AP MAC addresses and/or tower identifiers) and associated signal strengths and send this information to a server where the crowd-sourced database(s) are used to find the location of the portable electronic device. The location information is then sent by the server back to the portable electronic device. In some embodiments, the portable electronic device determines its location by downloading at least a portion of the crowd-sourced database(s) from the server and using the downloaded database(s) to find the location of the portable electronic device. Furthermore, GPS scan may be used either alone or in combination with WiFi and/or cellular network scans (e.g., as part of assisted GPS (AGPS)) to determine the location of the portable electronic device.

This location information can then be used to generate a user notification, based on the location of the portable electronic device. Note that a user notification may be any type of notification generated to signal or alert a user, and may include any combination of visual, auditory, and/or sensory components. The user notification may be configured to be triggered when the portable electronic device determines through its location scans that it is within a boundary (i.e., at a location). This boundary is sometimes also called a geo-fence. The boundary may be based on a combination of one or more of the following: natural boundaries, man-made boundaries, and/or imaginary boundaries, and may be static or dynamically generated, including boundaries entered by the user or from any other source. Then, when the portable electronic device determines, using the location information based on its wireless scans, that it is within the target location boundary, a user notification may be generated.

For example, when a user arrives home after work, the user may set a portable electronic device to generate a notification for the user to call a customer when the user returns to work (e.g., "work" may be a boundary the user has defined around his or her work location, or a boundary defined by the identification of a WiFi signal from a work WLAN). The portable electronic device will then begin using location scans (e.g., wireless scans of one or more of WiFi, cellular, and GPS scans) to determine the location of the portable electronic device. The portable electronic device may control the wireless scans to be generated at a default interval, such as every 45 seconds. Then, when the portable electronic device determines that its location is within the boundary defining the "work" location, the portable electronic device generates the notification to remind the user to make the customer call.

Note that, in some embodiments, the parameters that define the trigger for a location-based notification may be set or generated automatically (e.g., by the portable electronic device), sent to the portable electronic device by the user or someone else (e.g., a family member or a co-worker), or as above, entered into the portable electronic device by the user. For example, a family member may send a message to a user's portable electronic device to set a location-based reminder for the user to buy milk, if and when the user passes a supermarket (e.g., within a boundary, such as 0.5 miles around the supermarket, where the boundary may be determined by the family member or the user).

During operation of described embodiments, the portable electronic device may control wireless scans used to determine the location of the portable electronic device as follows. When a location-based notification is entered into a portable electronic device, the portable electronic device determines its location. Then, it determines a route to the boundary (e.g., the geo-fence) that will trigger the notification. The portable electronic device then determines the travel time to the boundary based on the route and the current location of the portable electronic device. The portable electronic device then controls the wireless scans (i.e., adjusts the frequency of the scans) used to determine its location based on the travel time.

For example, in the above scenario in which a user arrives at home and sets a location-based notification to trigger when the user arrives at work, the portable electronic device determines its current location (home) and then determines a travel route to the boundary (work) where the notification will be triggered. The portable electronic device then determines the travel time to work based on the route. In some embodiments, the portable electronic device may determine a number of travel routes, determine travel times for each route, and select the shortest travel time. The portable electronic device may also include factors, such as traffic, time of day, day of the week, holidays, etc. (e.g., is it rush-hour, or a holiday weekend). Then, the portable electronic device controls the interval between wireless scans used to determine its location based on the travel time.

Note that in some embodiments, the portable electronic device may determine the travel route by determining its current location using a location scan of its current location or an address book entry for the current location (e.g., home)), and determining the location of the boundary for the notification (e.g., work) using an address book entry or a previous location determination for the boundary. The portable electronic device may then determine the travel route and/or travel time by sending the current location and the boundary location to a map server that generates one or more travel routes based on the two locations. The server may then generate travel times for each route based on traffic and other information and send the travel times to the portable electronic device. In some embodiments, the portable electronic device may determine travel routes and travel times based on travel routes that have been used in the past and their associated travel times, which may be determined based on travel speeds associated with each portion of the travel route. For example, the portable electronic device may track travel routes, and associated travel speeds and travel time for the portable electronic device to be carried from home to work at based on the time of day and day of the week.

After the portable electronic device determines the quickest possible travel time to work (i.e., the boundary for the notification), it then increases the interval between wireless scans from the default interval (e.g., 45 seconds) to a multiple of the default interval (e.g., 2, 5, 10, or 20), or to a fixed interval (e.g., 10 minutes), or to an infinite interval (i.e., suspend the scans), or to any other interval longer than the default interval, until the time elapsed is within a predetermined time period of the end of the travel time. In some embodiments, when the portable electronic device determines the travel time, it sets the interval between the wireless scans to a fraction of the travel time, and uses each successive wireless scan to determine the location of the portable electronic device and the travel time to the boundary, and again sets the interval based on the re-calculated travel time. This process of adaptively setting the interval between location scans continues until the travel time is below a threshold travel time (e.g., 10 minutes, or 10 times the default interval between wireless scans). When the travel time is below the threshold travel time, the interval is set to the default interval.

In some embodiments, when more than one boundary for notification exists (e.g., work and a store), the portable electronic device may treat each boundary and its associated location scan intervals independently and perform location scans when called for by each independently determined scan schedule. In other embodiments, when more than one boundary for notification exists, the portable electronic device may set the scan interval based on which boundary has the shortest travel time from the current location. The scan interval may then be updated based on future location scan as the portable electronic device moves closer or farther away from one or more of the boundaries.

In some embodiments, when notifications (which may include notifications not related to location, such as time-based alarms, ringing notifications (when a voice call is received), notifications that are responsive to an incoming text message or "push" notification) are suppressed on the portable electronic device, the interval between wireless scans used to determine the location of the portable electronic device is increased (e.g., in multiples of the default interval, by absolute steps, such as 5 or 10 minutes, or by using any other process). For example, a user may enter a location-based notification for work as described above. The user may then put the portable electronic device into a do not disturb (DND) state when going to sleep for the night, or the portable electronic device may already be in a DND state. In the DND state, one or more types of notification are suppressed (i.e., not performed) during a predetermined time period (e.g., from 10 PM to 6 AM). When the DND period starts (e.g., at 10 PM), the portable electronic device increases the interval between wireless scans used to determine the location of the portable electronic device from the default interval (e.g., 45 seconds between scans) to a larger interval (e.g., 2, 5, 10, or 20 times the default interval, or a fixed time duration such as 10 minutes). In some embodiments, the portable electronic device may increase the interval between location scans to a first interval (e.g., 5 times the default) for the first time duration of the DND period (e.g., the first hour). Then, from the end of the first time duration until the beginning of a last time duration of the DND period (e.g., the last hour), the interval may be increased again to 10 times the default, and then back down to 5 times the default interval for the last time duration of the DND period. In this way, when a user sets the portable electronic device for a DND period, if the user gets to bed late or wakes up early, the portable electronic device will be able to more quickly detect that its location has changed.

In some embodiments, the portable electronic device may continue to maintain the interval at the default interval even when one or more types of notification are suppressed, such as during a DND period, if the portable electronic device senses it is moving or not at home (e.g., not within a geo-fence of home), is at a hotel, or if it has moved within a predetermined time period (e.g., the most recent 15 or 30 minutes). In some embodiments, when notifications are suppressed on the portable electronic device, such as when a "silent switch" is used on a smartphone, the portable electronic device may increase the interval between location-based scans to a larger or infinite (e.g., suppress the scans) interval.

Portable Electronic Device

FIG. 1 presents a block diagram illustrating portable electronic device 100 in accordance with described embodiments. Portable electronic device 100 includes processing subsystem 102, memory subsystem 104, networking subsystem 106, and GPS subsystem 108, all coupled together and communicating through bus 110.

Processing subsystem 102 includes one or more devices configured to perform computational operations. For example, processing subsystem 102 can include one or more microprocessors, application-specific integrated circuits (ASICs), microcontrollers, application processors, and/or programmable-logic devices.

Memory subsystem 104 includes one or more devices for storing data and/or instructions for processing subsystem 102, and networking subsystem 106. For example, memory subsystem 104 can include any type of computer-readable storage medium such as dynamic random access memory (DRAM), static random access memory (SRAM), and/or other types of memory. In addition, memory subsystem 104 can include mechanisms for controlling access to the memory. In some embodiments, memory subsystem 104 includes a memory hierarchy that comprises one or more caches coupled to a memory in portable electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by portable electronic device 100 as fast-access storage for often-used data, while the mass-storage device is used to store less frequently used data.

Networking subsystem 106 includes one or more devices configured to couple to and communicate on a wired and/or wireless network (i.e., to perform network operations), including one or more cellular subsystems that may include cellular data and cellular voice networks (e.g., a 3G/4G network such as 1x, UMTS, LTE, etc.), and a WLAN subsystem for communicating on a WLAN network, including portions based on standards described in IEEE 802.11 (such as a Wi-Fi networking system). Networking subsystem 106 can include a Bluetooth networking subsystem (which may include Bluetooth low energy (BLE) capabilities, a universal serial bus (USB) networking system, an Ethernet networking system, and/or another networking system). Networking subsystem 106 includes processors, controllers, radios/antennas, sockets/plugs, and/or other devices used for coupling to, communicating on, and handling data and events for each supported networking system.

GPS subsystem 108 includes one or more chips (e.g., a chip set) used to implement a GPS receiver. GPS subsystem 108 receives signals from GPS satellites and uses these signals to determine the location of portable electronic device 100.

GPS subsystem 108, and the cellular and WLAN subsystems in networking subsystem 106 can be controlled by processing subsystem 102 to generate and/or receive wireless scans that are used to determine the location of portable electronic device 100. In some embodiments, information from a wireless scan by one or more of the wireless subsystems (i.e., WLAN subsystem, cellular subsystem, and GPS subsystem 108) is sent to processing subsystem 102, and processing subsystem 102 uses this information to determine the location of portable electronic device 100. Note that, in some embodiments, the information from one or more wireless scans may also be used within network subsystem 106 and/or GPS subsystem 108 to determine the location of portable electronic device 100 and the location may then be sent to processing subsystem 102.

Processing subsystem 102, memory subsystem 104, networking subsystem 106, and GPS subsystem 108 are coupled together using bus 110. Bus 110 is an electrical, optical, or electro-optical connection that the subsystems can use to communicate commands and data among one another. Although only one bus 110 is shown for clarity, different embodiments can include a different number or configuration of electrical, optical, or electro-optical connections among the subsystems.

Although shown as separate subsystems in FIG. 1, in some embodiments, some or all of a given subsystem can be integrated into one or more of the other subsystems in portable electronic device 100. Although alternative embodiments can be configured in this way, for clarity we describe the subsystems separately.

Portable electronic device 100 can be (or can be included in) any device with at least one processing subsystem and one networking subsystem. For example, portable electronic device 100 can be (or can be included in) a laptop computer, a media player, a subnotebook/netbook, a tablet computer, a cellular phone, a personal digital assistant (PDA), a smartphone, a toy, a controller, or another device.

Portable electronic device 100 may also include one or more additional processing subsystems 102, memory subsystems 104, networking subsystems 106, and/or GPS subsystems 108. Additionally, one or more of the subsystems may not be present in portable electronic device 100. Furthermore, although we use specific subsystems to describe portable electronic device 100, in alternative embodiments, portable electronic device 100 may include one or more additional subsystems that are not shown in FIG. 1. For example, portable electronic device 100 may also include, without limitation, a data collection subsystem, an alarm subsystem, an audio subsystem, a display subsystem and/or an input/output (I/O) subsystem. For example, portable electronic device 100 may include a display subsystem which can include any type of display technology, such as light-emitting diode (LED), organic light-emitting diode (OLED), liquid crystal display (LCD) (such as thin film transistor (TFT), and/or other types of display technology. In addition, the display subsystem may include mechanisms for processing data, and/or other information for display and may also include an audio subsystem for producing sound. The display subsystem may also include touch screen technology for inputting information into portable electronic device 100. In some embodiments, one or more memory caches and/or processing systems or other hardware modules may be located in the display subsystem.

Operating System

Figure 2:
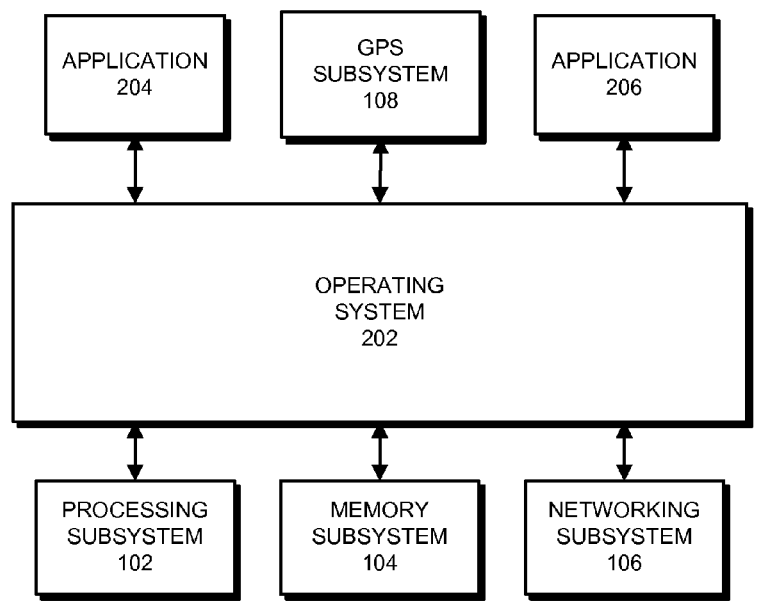
FIG. 2 presents a block diagram illustrating an operating system, applications and subsystems of a portable electronic device in accordance with described embodiments.

FIG. 2 presents a block diagram illustrating operating system 202 in accordance with the described embodiments. In some embodiments, operating system 202 is stored (as program code) in memory subsystem 104 and executed by processing subsystem 102.

Generally, operating system 202 serves as an intermediary between system hardware in portable electronic device 100 (e.g., subsystems 102-108) and applications executed by processing subsystem 102, such as applications 204-206 (which can be, for example, an email application, a web browser, a text messaging application, a voice communication application, an alarm application, and/or a game application). For example, operating system 202 can be, but is not limited to: the iOS operating system or OS X operating system, both from Apple Inc. of Cupertino, Calif.; Windows Phone from Microsoft Corporation; Android from the Open Handset Alliance; the FreeBSD operating system from The FreeBSD Foundation of Boulder, Colo.; or another operating system. Operating systems and their general functions are known in the art and hence are not described in detail.

To manage the transfer of packets to and from applications 204-206 and operating system 202 in portable electronic device 100 using an appropriate interface in networking subsystem 106, operating system 202 maintains one or more network protocol stacks (not shown) that each includes a number of logical layers. For example, the operating system can maintain a cellular protocol stack and/or an Internet protocol stack, which includes the link, Internet, transport, and application layers. As another example, the operating system can maintain a protocol stack based on the OSI model, which includes the application, presentation, session, transport, network, data-link, and physical layers. At corresponding layers of the protocol stack, the operating system includes control mechanisms and data structures for performing the functions associated with the layer. The functions associated with each of the layers in the protocol stack are known in the art and hence are not described in detail.

Controlling Wireless Scans Used to Determine Location

Figure 3:
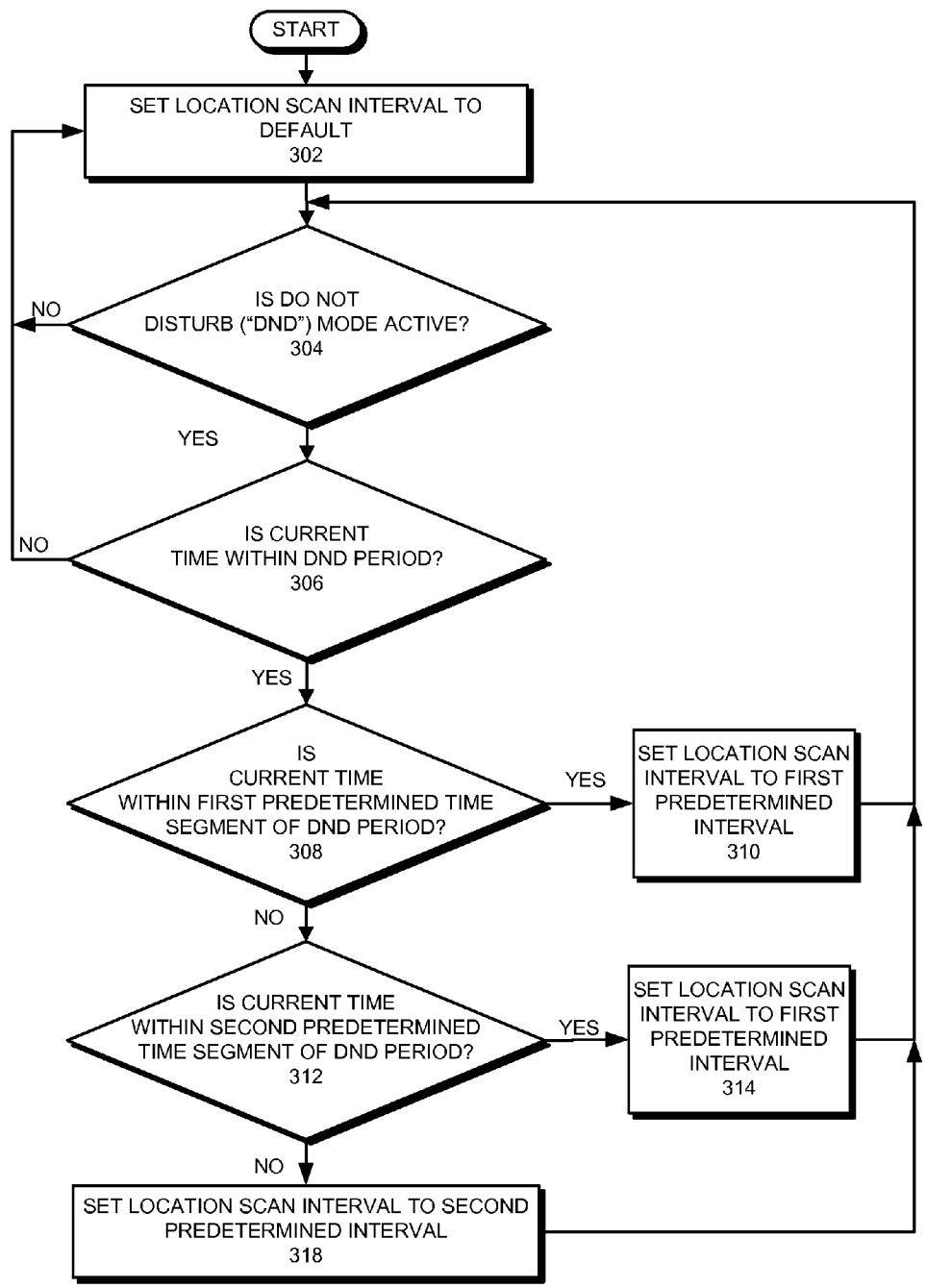
FIG. 3 presents a flowchart illustrating a process for controlling wireless scans used to determine a location of a portable electronic device in accordance with described embodiments.

FIG. 3 presents a flowchart illustrating a process for controlling wireless scans used to determine a location of a portable electronic device in accordance with described embodiments. The operations shown in FIG. 3 may be performed by a portable electronic device, such as portable electronic device 100.

The process of FIG. 3 may begin when a location-based notification has been entered into portable electronic device 100. Portable electronic device 100 sets the interval between wireless scans to the default interval in step 302. Portable electronic device 100 may set the interval between wireless scans to the default interval using processing subsystem 102 to communicate with networking subsystem 106 and/or GPS subsystem 108 to set the location scan interval to the default interval (e.g., by setting a value in firmware or memory in networking subsystem 106 and/or GPS subsystem 108). Then, at step 304, portable electronic device 100 determines if it is in a DND mode. If it is not, then the process returns to step 302 and the interval between wireless scans used to determine the location of portable electronic device 100 remains at the default interval. If portable electronic device 100 is in a DND mode, the process continues to step 306.

At step 306, if the current time is not within the DND period, then the process returns to step 302 and the interval between wireless scans remains at the default interval. At step 306 if the current time is within the DND period, then the process continues to step 308. Then, if the current time is within a first predetermined time segment of the DND period (e.g., the first hour of the DND period), then the process continues to step 310 and the location scan interval is set to a first predetermined interval (e.g., 5 times the default interval, or a fixed interval such as 10 minutes), and the process then returns to step 304. If the current time is not within the first predetermined time segment of the DND period at step 308, the process continues to step 312.

At step 312 if the current time is within a second predetermined time segment of the DND period (e.g., the last hour of the DND period), then the process continues to step 314, the location scan interval is set to the first predetermined interval, and the process returns to step 304. Note that, in some embodiments, the location scan interval may be set to an interval other than the first predetermined interval at step 314. At step 312, if the current time is not within the second predetermined time segment of the DND period, then the process continues to step 318.

At step 318 the location scan interval is set to a second predetermined interval which may be longer than the first predetermined interval. The process then returns to step 304. In some embodiments, the process may return to step 302 and set the location scan interval to the default interval when portable electronic device 100 detects that it has moved, and/or if one or more notifications has been permitted to be generated (e.g., if the DND state allows a call from certain phone numbers or repeated calls to generate a ringtone).

Note that, in some embodiments, steps 308 through 314 may be omitted and whenever the current time is within the DND period, the location scan interval is set to an interval longer than the default interval (e.g., step 318).

Note also that in some embodiments as discussed above, whenever portable electronic device 100 is in any state that suppresses any type of notification, then portable electronic device 100 may set the location scan interval to an interval that is longer than the default interval. Then, when portable electronic device 100 is no longer suppressing notifications, it may return the location scan interval to the default interval. Furthermore, in some embodiments, when notifications are suppressed on portable electronic device 100, it may determine its location and set the location scan interval based on a travel time to the boundary (e.g., geo-fence) for a location-based notification. For example, portable electronic device 100 may be suppressing notifications (e.g., due to being in a DND state) and there may be a location-based notification set to go off when portable electronic device 100 enters the "work" boundary. Then, while portable electronic device 100 is in the DND state, it may set the location scan interval based on the travel time to work.

Figure 4:
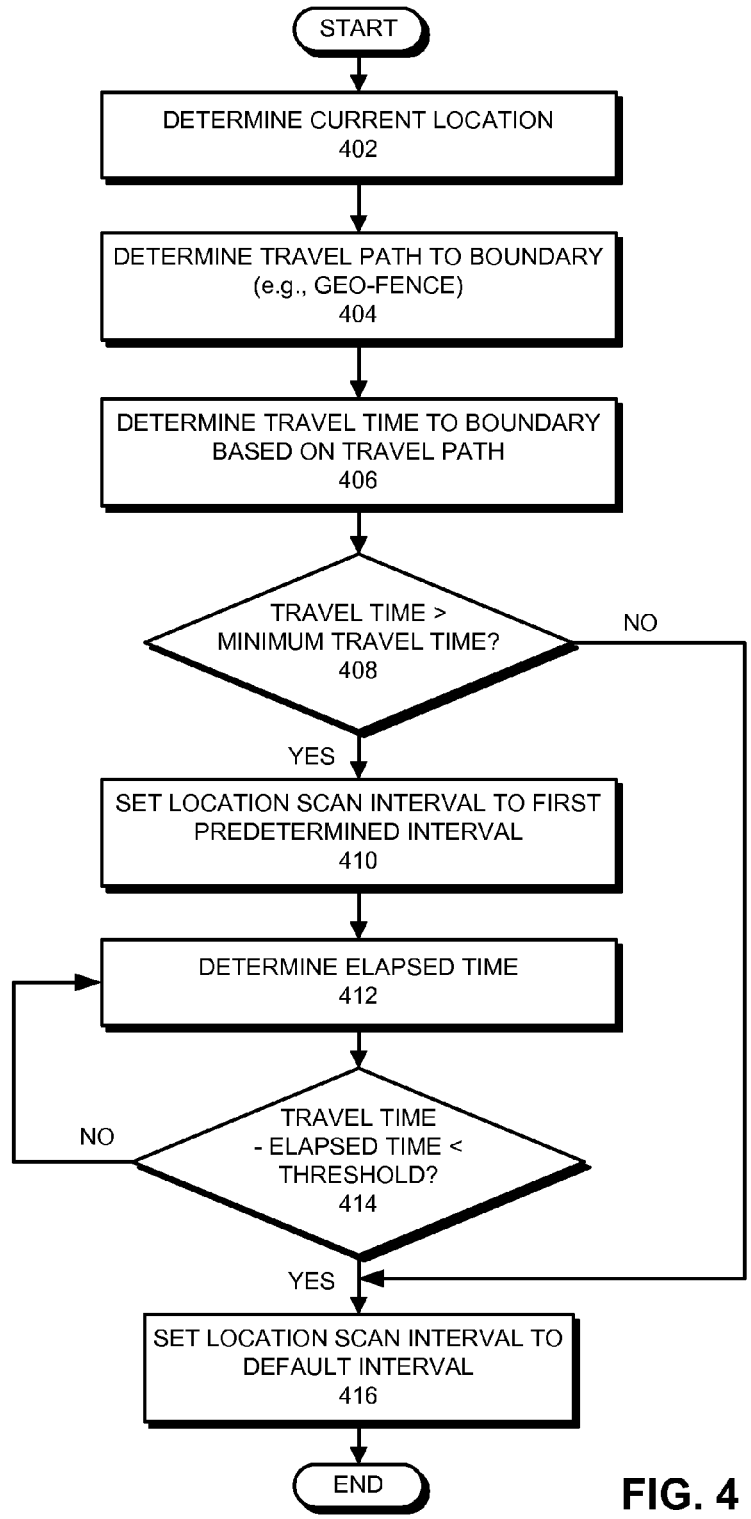
FIG. 4 presents a flowchart illustrating another process for controlling wireless scans used to determine a location of a portable electronic device in accordance with described embodiments.

FIG. 4 presents a flowchart illustrating another process for controlling wireless scans used to determine a location of a portable electronic device in accordance with described embodiments. The operations shown in FIG. 4 may be performed by a portable electronic device, such as portable electronic device 100.

The process of FIG. 4 may begin when a location-based notification has been entered into portable electronic device 100. Portable electronic device 100 determines its current location at step 402. The current location of portable electronic device 100 may be determined using any desired method including, but not limited to, one or more wireless location scans. Then, at step 404, portable electronic device 100 determines a travel path to the boundary (e.g., geo-fence) of the location-based notification. In some embodiments, portable electronic device 100 may determine more than one travel path to the boundary, based on traffic patterns, a record of past travel paths that have been used, or any other information. Then, at step 406, the travel time to the boundary from the current location is determined based on the travel path. Note that the travel time may be determined based on a fastest reasonable travel speed (e.g., on a highway), a record of travel times based on previous travel, a database of traffic, and/or other travel information. Additionally, the travel time for more than one travel path may be determined, and the fastest travel time selected.

At step 408, if the travel time is not greater than a minimum travel time, then the process jumps to step 416 and the location scan interval is set to the default interval. However, at step 408 if the travel time is greater than a minimum travel time, the process continues to step 410. The minimum travel time may be set based on any desired parameter including, but not limited to, the default interval, or a fixed time period such as 5 minutes. Additionally, in some embodiments, if the distance between the current location of portable electronic device 100 and the boundary is less than a predetermined distance (e.g., one-half mile), then the process may jump to step 416. Note that, in some embodiments, step 408 may be omitted.

At step 410, the location scan interval is set to a first predetermined interval which is longer than the default interval. The first predetermined interval may be set to a multiple of the default interval (e.g., 5 or 10 times), a fixed interval (e.g., 10 or 15 minutes), an infinite interval (e.g., location scans are suspended), or as a function of the travel time (e.g., 50%, or 75%). Then, at step 412, the amount of time that has elapsed is determined; at step 414, if the travel time minus the elapsed time is not less than a threshold (e.g., 5 minutes), then the process returns to step 412, while if the travel time minus the elapsed time is less than the threshold, then the process continues to step 416.

In some embodiments, at step 410 the location scan interval may be set to a fraction of the travel time (e.g., 50%) and after step 410, the process returns to step 402, and steps 412-414 are eliminated. Then, at step 402, when portable electronic device 100 again determines its location, after the location scan interval is set at step 410, the process starts again using the newly determined location.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for controlling wireless scans used to determine a location of a portable electronic device, comprising:
    determining a current location of the portable electronic device;
    determining a boundary for a destination location;
    determining a travel route between the current location of the portable electronic device and the boundary;
    determining a projected total travel time to the boundary based at least in part on the travel route and a condition for the travel route;
    determining the projected total travel time is greater than a threshold travel time;
    setting an interval between wireless scans to a predetermined level based at least in part on the determination that the projected total travel time is greater than the threshold travel time;
    calculating a remaining travel time using an actual elapsed travel time associated with the portable electronic device and the projected total travel time; and
    adjusting the interval between wireless scans to a default interval based at least in part on the calculated remaining traveling time being less than a threshold value.

2. The method of claim 1, wherein the condition for the travel route comprises a travel speed on the travel route.

3. The method of claim 2, wherein the travel speed includes traffic information related to the travel route.

4. The method of claim 1, wherein the wireless scans include wireless scans used to determine the location of the portable electronic device with respect to the boundary.

5. The method of claim 4, wherein the wireless scans include location service scans and the boundary includes a geo-fence.

6. A portable electronic device, comprising:
a networking subsystem that performs periodic wireless scans for determining a location of the portable electronic device; and
a processing subsystem coupled to the networking subsystem and configured to:
determine a current location of the portable electronic device;
determine a boundary for a destination location;
determine a travel route between the current location of the portable electronic device and the boundary;
determine a projected total travel time to the boundary based at least in part on the travel route and a condition for the travel route;
determine the projected total travel time is greater than a threshold travel time;
set an interval between wireless scans to a predetermined level based at least in part on the determination that the projected total travel time is greater than the threshold travel time;
calculate a remaining travel time using an actual elapsed travel time associated with the portable electronic device and the projected total travel time; and
adjust the interval between wireless scans to a default interval based at least in part on the calculated remaining traveling time being less than a threshold value.

7. The portable electronic device of claim 6, wherein the processing subsystem is configured to determine the projected total travel time by communicating the location of the portable electronic device and the boundary to a server and receiving the projected total travel time from the server.

8. The portable electronic device of claim 6, wherein the wireless scans include location service scans and the boundary includes a geo-fence.

9. A non-transitory computer-readable storage medium storing instructions that, when executed by a processing subsystem in a portable electronic device, cause the portable electronic device to perform a method for controlling wireless scans used to determine a location of the portable electronic device, the method comprising:
determining a current location of the portable electronic device;
determining a boundary for a destination location;
determining a travel route for traveling between the current location of the portable electronic device and the boundary;
determining a projected total travel time to the boundary based at least in part on the travel route and a condition for the travel route;
determining the projected total travel time is greater than a threshold travel time;
setting an interval between wireless scans to a predetermined level based at least in part on the determination that the projected total travel time is greater than the threshold travel time;
calculating a remaining travel time using an actual elapsed travel time associated with the portable electronic device and the projected total travel time; and
adjusting the interval between wireless scans to a default interval based at least in part on the calculated remaining traveling time being less than a threshold value.

10. The non-transitory computer-readable storage medium of claim 9, wherein the condition for the travel route comprises a travel speed on the travel route.

11. The non-transitory computer-readable storage medium of claim 10, wherein the travel speed includes traffic information related to the travel route.

12. The non-transitory computer-readable storage medium of claim 9, wherein the wireless scans include wireless scans used to determine the current location of the portable electronic device with respect to the boundary.

13. The non-transitory computer-readable storage medium of claim 12, wherein the wireless scans include location service scans and the boundary includes a geo-fence.

14. The method of claim 1, wherein setting the interval between the wireless scans to the predetermined level includes setting the interval between the wireless scans based at least in part on the portable electronic device being in a notification suppression mode.

15. The portable electronic device of claim 6, wherein configuring the processing subsystem to set the interval between the wireless scans to the predetermined level includes configuring the processing subsystem to set the interval between the wireless scans to the predetermined level based at least in part on the portable electronic device being in a notification suppression mode.

16. The non-transitory computer-readable storage medium of claim 9, wherein setting the interval between the wireless scans to the predetermined level includes setting the interval between the wireless scans to the predetermined level based at least in part on the portable electronic device being in a notification suppression mode.

17. The method of claim 1, wherein setting the interval between the wireless scans to the predetermined level includes setting the interval between the wireless scans to the predetermined level based at least in part on a current time.

18. The method of claim 14, wherein setting the interval between wireless scans to the predetermined level further comprises:
determining a current time is within a period of time associated with the notification suppression mode;
determining the portable electronic device is within a predetermined time segment in the period of time associated with the notification suppression mode; and
setting the interval between wireless scans to the predetermined interval based at least on the determination that the portable electronic device is within the predetermined time segment.

19. The portable electronic device of claim 15, wherein configuring the processing subsystem to set the interval between wireless scans to the predetermined level further comprises:
determine a current time is within a period of time associated with the notification suppression mode;
determine the portable electronic device is within a predetermined time segment in the period of time associated with the notification suppression mode; and
set the interval between wireless scans to the predetermined interval based at least on the determination that the portable electronic device is within the predetermined time segment.

20. The non-transitory computer-readable storage medium of claim 9, wherein setting the interval between wireless scans to the predetermined level further comprises:
    determining a current time is within a period of time associated with the notification suppression mode;
    determining the portable electronic device is within a predetermined time segment in the period of time associated with the notification suppression mode; and
    setting the interval between wireless scans to the predetermined interval based at least on the determination that the portable electronic device is the predetermined time segment.

\* \* \* \* \*